United States Patent [19]

Fukumoto

[11] Patent Number: 5,544,084
[45] Date of Patent: Aug. 6, 1996

[54] MULTIPLIER COMPOSED OF INTEGRATED SEMICONDUCTOR CIRCUIT OCCUPYING REDUCED AREA

[75] Inventor: Naoko Fukumoto, Tokyo, Japan

[73] Assignee: NEC Corporation, Tokyo, Japan

[21] Appl. No.: 335,964

[22] Filed: Nov. 7, 1994

[30] Foreign Application Priority Data

Nov. 19, 1993  [JP]  Japan .................... 5-290339

[51] Int. Cl.⁶ ............................................ G06F 7/52
[52] U.S. Cl. ................................................. 364/760
[58] Field of Search ............................ 364/760, 757, 364/754, 490, 491

[56] References Cited

U.S. PATENT DOCUMENTS

| 4,646,257 | 2/1987 | Essig et al. ............... | 364/760 |
| 5,291,431 | 3/1994 | Ho et al. .................. | 364/760 |
| 5,465,226 | 11/1995 | Goto ........................ | 364/760 |

FOREIGN PATENT DOCUMENTS 55-105732  8/1980  Japan .

OTHER PUBLICATIONS

Krahl, et al., "Schnelles1²L–Multiplizer—und Dividierfeld", 2421 Radio Fernsehen Elektronik, V29 N3, 1980, Berlin DE, pp. 150–154.

Anderson, et al., "A CMOS LSI 16x16 Multiplier/Multiplier Accmulator", IEEE International Solid State Circuits Conference, V25, Feb. 1982, pp. 124–125, 308.

*Primary Examiner*—Tan V. Mai
*Attorney, Agent, or Firm*—Whitham, Curtis, Whitham & McGinn

[57] ABSTRACT

A multiplier has an arithmetic unit for multiplying an N-bit multiplicand stored in a second register by an M-bit multiplier stored in a first register according to the Booth's algorithm, and a third register for holding a result or product produced by the arithmetic unit. The first, second, and third registers, and the arithmetic unit are disposed on one substrate surface. The third register is disposed between the arithmetic unit and the second register. The second register is disposed between the third register and a fourth register. The result or product is transferred from the third register directly to the second register or the fourth register, and given as a multiplicand repeatedly to the second register to repeat a multiplication. Since the second and third registers are disposed adjacent to each other, wires required for giving the multiplicand repeatedly to the second register are made shorter.

8 Claims, 8 Drawing Sheets

MULTIPLIER COMPOSED OF INTEGRATED SEMICONDUCTOR CIRCUIT OCCUPYING REDUCED AREA

BACKGROUND OF THE INVENTION (1) Field of the Invention

The present invention relates to a multiplier composed of an integrated semiconductor circuit, and more particularly to a multiplier for multiplying a multiplicand repeatedly by a multiplier.

Figure 1:
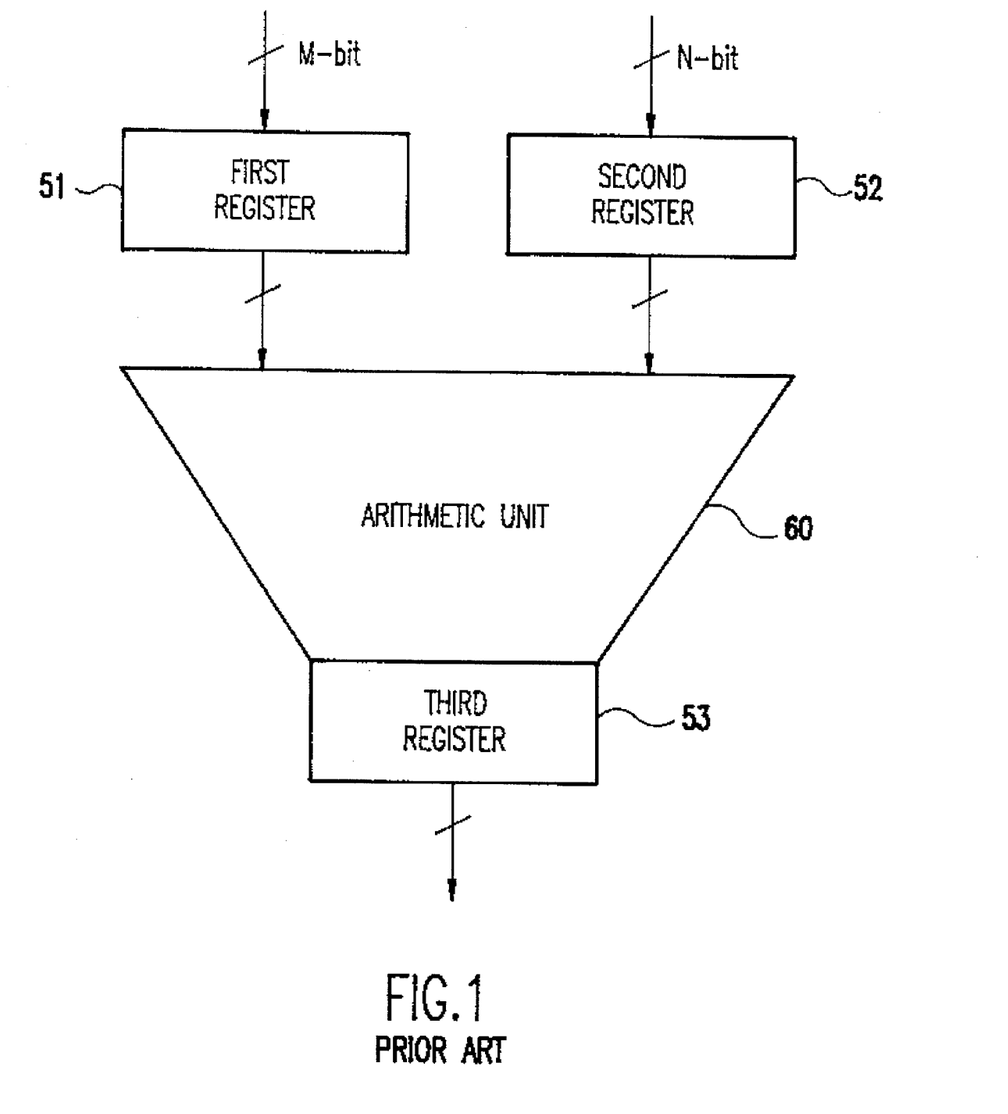
FIG. 1 is a block diagram of a conventional multiplier.

(2) Description of the Related Art:

FIG. 1 of the accompanying drawings shows in block form a multiplier for multiplying an N-bit multiplicand repeatedly by an M-bit multiplier. As shown in FIG. 1, the multiplier comprises a first register 51 for temporarily storing the M-bit multiplier, a second register 52 for temporarily storing the N-bit multiplicand, an arithmetic unit 60 supplied with output signals from the first and second registers 51, 52 for generating a plurality of partial products and adding the partial products, and a third register 53 for temporarily storing an output signal from the arithmetic unit 60 as a product.

Figure 2:
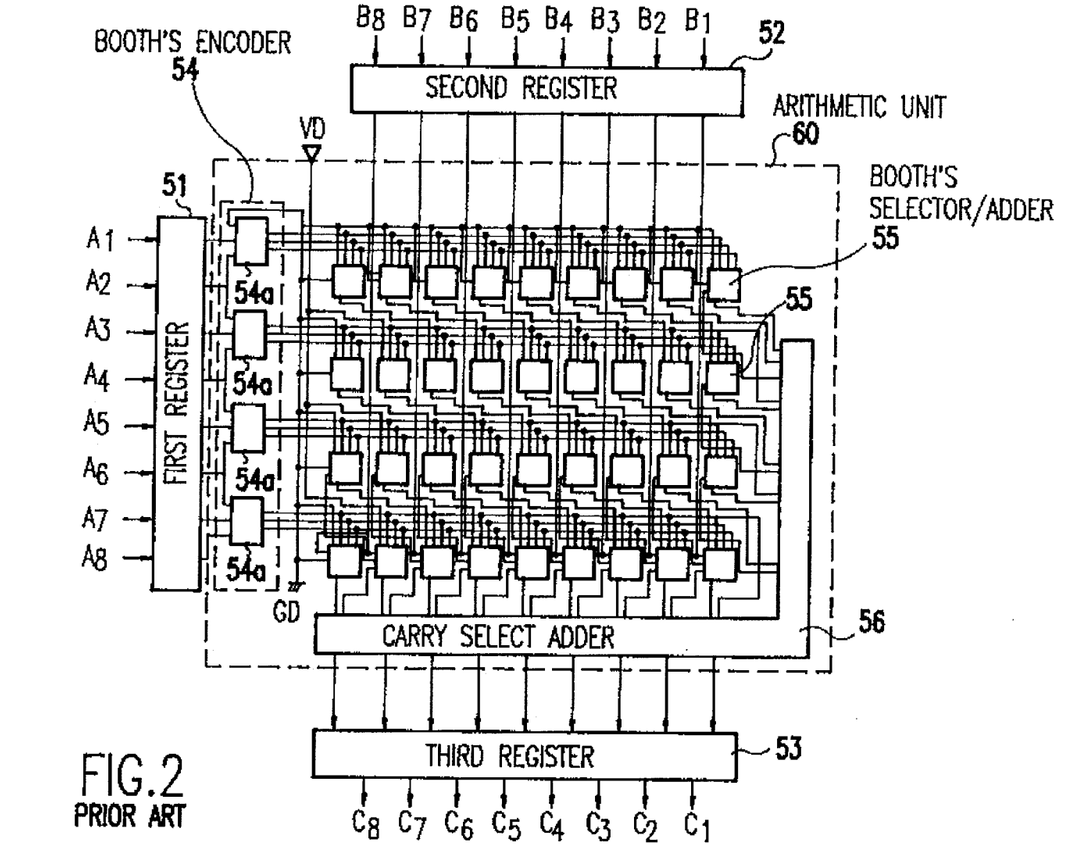
FIG. 2 is a diagram showing a wiring arrangement of the conventional multiplier shown in FIG. 1.

FIG. 2 of the accompanying drawings shows a specific arrangement of the multiplier shown in FIG. 1. Such a multiplier circuit arrangement is disclosed in Japanese Patent Laid-open No. Showa 55-105732. The first and second registers 51, 52 are supplied with an 8-bit multiplier $A_1, A_2, \sim, A_8$ and an 8-bit multiplicand $B_1, B_2, \sim, B_8$. The arithmetic unit 60 comprises a Booth's encoder 54, a rectangular matrix of Booth's selector/adders 55, and a carry select adder 56. The arithmetic unit 60 is supplied with the multiplier $A_1, A_2, \sim, A_8$ and the multiplicand $B_1, B_2, \sim, B_8$, and multiplies the multiplicand by the multiplier according to the Booth's algorithm.

The Booth's encoder 54 is composed of a plurality of encoders 54a for outputting a code corresponding to the multiplier supplied from the first register 51. The Booth's selector/adders 55 select a multiplicand which will become a partial product, based on the code outputted by the Booth's encoder 54, and add a partial product from the Booth's selector/adders 55 in a row positioned thereabove in FIG. 2. The third register 53 receives the result from the arithmetic unit 60, and outputs a product $C_1, C_2, \sim, C_8$. In the multiplier, therefore, the Booth's encoder 54 outputs information (code) for generating partial products based on the Booth's algorithm, the output signal from the Booth's encoder 54 is supplied to the Booth's selectors to generate partial products, and the partial products are added according to the carry/save process at the same time that the partial products are generated.

In FIG. 2, a ground potential GD corresponds to a logic level 0 and a power supply potential VD corresponds to a logic level 1. The multiplier shown in FIG. 2 employs the Booth's algorithm as a multiplication algorithm for generating partial products. The bits of the output signal from the first register 51 are supplied to the corresponding encoders 54a. Output signals from the encoders 54a are supplied as information for generating partial products to the Booth's selector/adders 55 in the respective rows corresponding to the encoders 54a. At this time, the output signals from the encoders 54a are supplied in common to the input terminals of the corresponding Booth's selector/adders 55 for generating partial products corresponding to all the bits of the output signal from the second register 52 and adding the partial products.

Figure 3:
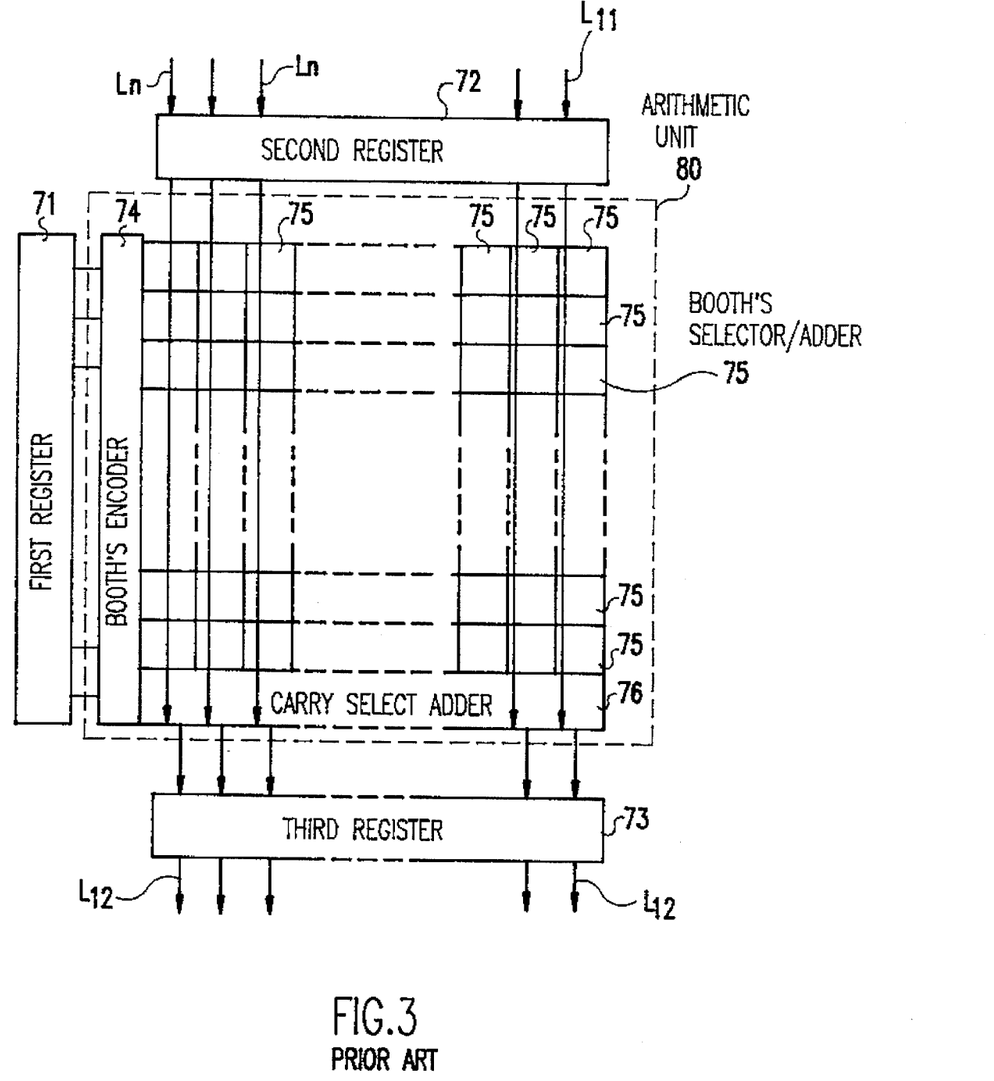
FIG. 3 is a diagram showing a layout and a wiring arrangement of the conventional multiplier shown in FIG. 1.

FIG. 3 of the accompanying drawings shows a layout and signal wires of the multiplier shown in FIG. 2, the multiplier serving to multiply an N-bit multiplicand by an M-bit multiplier. A first register 71 stores the M-bit multiplier which is given, and a second register 72 stores the N-bit multiplicand which is given. An arithmetic unit 80 comprises a Booth's encoder 74, a rectangular matrix of Booth's selector/adders 75, and a carry select adder 76. The arithmetic unit 80 is supplied with the multiplier and the multiplicand respectively from the first and second registers 71, 72, and multiplies the multiplicand by the multiplier according to the Booth's algorithm. The product produced by the arithmetic unit 80 is stored by a third register 73.

If the product is to be further multiplied by a multiplier, then the contents of the third register 73 are transferred to the second register 72 through output wires $L_{12}$ of the third register 73 and input wires $L_{11}$ of the second register 72, and a multiplying process similar to the above process is carried out by the arithmetic unit 80. If the contents of the third register 73 are to be passed through another register so as to be transferred to the second register 72, then the contents of the third register 73 are transferred through the output wires $L_{12}$, a RAM 77 (see FIG. 4 of the accompanying drawings), and the input wires $L_{11}$ to the second register 72.

Figure 4:
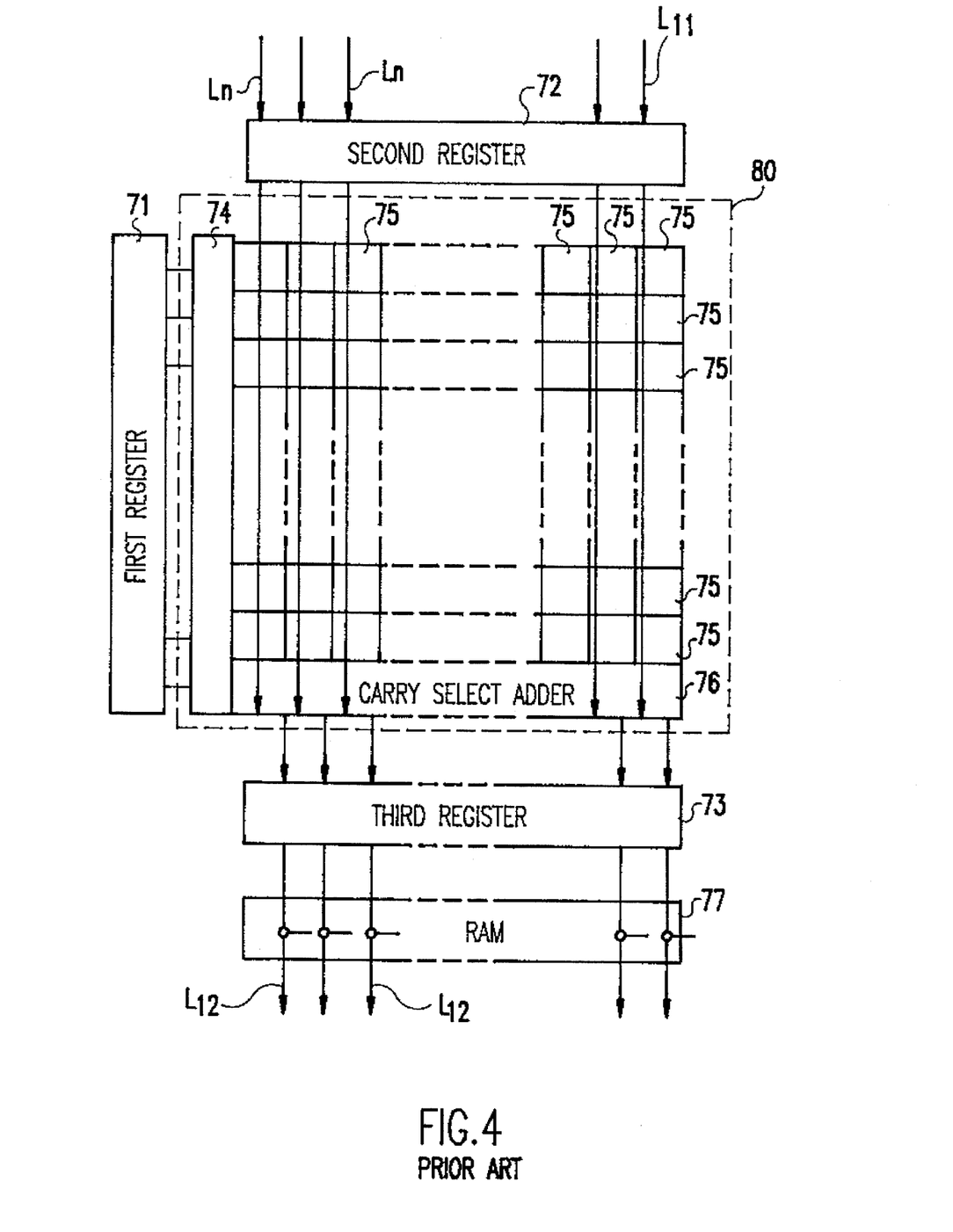
FIG. 4 is a diagram showing a layout and a wiring arrangement of another conventional multiplier.

The multiplier layouts shown in FIGS. 3 and 4 are characterized in that the third register 73 is disposed on a side of the arithmetic unit 80 where a carry select adder 76 is located, and the second register 72 is disposed on a side of the arithmetic unit 80 remote from the carry select adder 76 and extends along an outer edge of the arithmetic unit 80.

Figure 5:
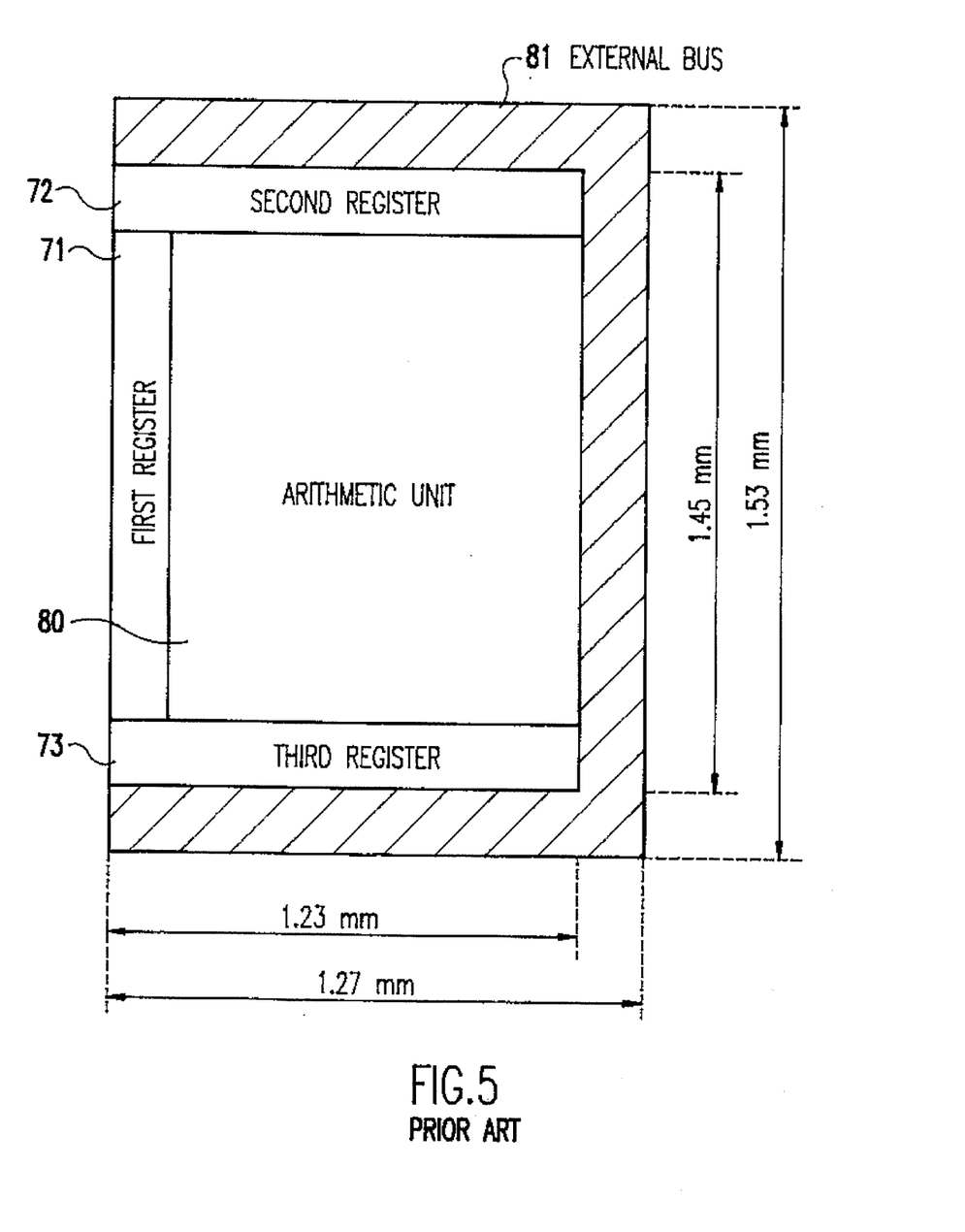
FIG. 5 is a diagram showing layout areas of the conventional multiplier shown in FIG. 3.

With the conventional multiplier layouts, when repeated multiplications are to be carried out, a bus composed of as many wires as the number of bits of data has to be added outside of the multiplier for transferring the data from the third register which temporarily stored the product to the first or second register. Therefore, the multipliers have occupied a large area due to the required bus. For example, the bus can be provided along the sides of the arithmetic unit 80 as shown in FIG. 5.

SUMMARY OF THE INVENTION

It is an object of the present invention to provide a multiplier which has a layout capable of repeating multiplications without the use of an external bus.

To achieve the above object, there is provided in accordance with the present invention a multiplier comprising an integrated semiconductor circuit comprising a first register for storing an M-bit multiplier, a second register for storing an N-bit multiplicand, an arithmetic unit composed of a rectangular matrix of arithmetic elements arranged in rows and columns, a Booth's encoder disposed along a first outer edge of the rectangular matrix parallel to the columns, and a carry select adder disposed along a second outer edge of the rectangular matrix parallel to the rows, the arithmetic elements in each of the columns having input terminals connected by a common wire in each of the columns, the arrangement being such that bits of the multiplicand stored in the second register are inputted through the common wires to the arithmetic elements, the M-bit multiplier is encoded by the Booth's encoder and outputted, and an encoded output is supplied to the arithmetic elements and added according to a carry/save process, whereby the N-bit multiplicand stored in the second register is multiplied by the M-bit multiplier stored in the first register according to a Booth's algorithm, and a third register for storing a product produced by the arithmetic unit, the first register extending along the Booth's encoder, the third register extending along the carry select adder, the second register extending along the third register in confronting relation to the carry select adder with the third register interposed therebetween, the second register and the arithmetic unit being connected by common wires which pass through the third register.

Preferably, the third register has output wires extending out of the multiplier through the second register, and the first, second, and third registers, the arithmetic unit, the common wires, and wires connected to the first, second, and third registers, and the arithmetic unit are disposed on one substrate surface.

The multiplier may further comprise a fourth register for receiving the product stored in the third register and storing the received product in the second register in order to repeat a multiplication. The fourth register is disposed outwardly of the second register and extends parallel to the second register. The third register has output wires extending through the second register and connected to input terminals of the fourth register. The second register has input wires extending through the fourth register and connected to input terminals of the second register and output terminals of the fourth register.

The multiplier can easily be reduced in size when implemented as a semiconductor circuit.

Since the second register is disposed outwardly of the third register which holds the result or product, the second register may be connected to the third register through short wires for giving the product as a multiplier from the third register repeatedly to the second register. Short wires may also be used to transfer the product from the third register through the fourth register to the second register.

The above and other objects, features, and advantages of the present invention will become apparent from the following description referring to the accompanying drawings which illustrate examples of preferred embodiments of the present invention.

DETAILED DESCRIPTION OF THE PREFERRED EMBODIMENTS

Figure 6:
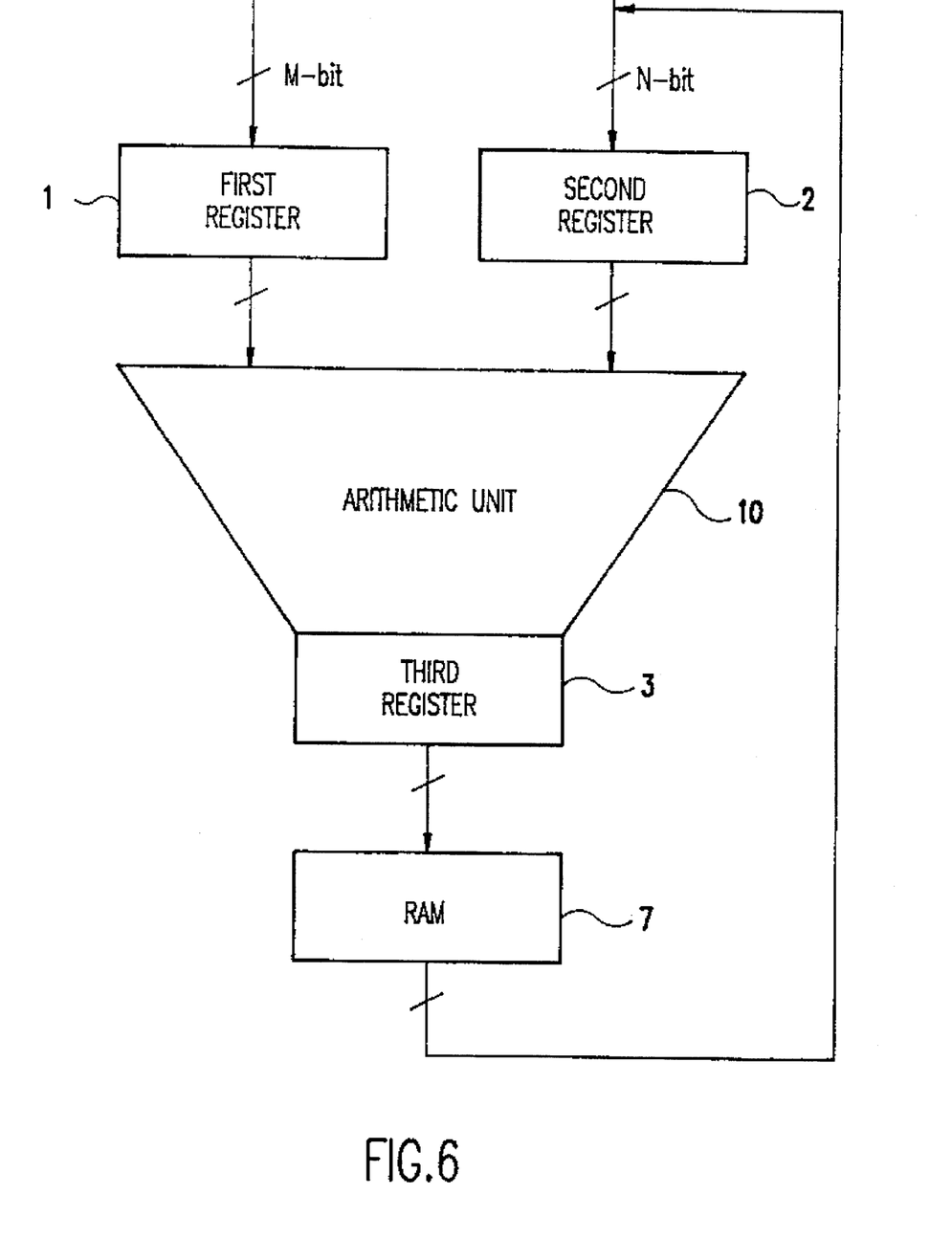
FIG. 6 is a block diagram of a multiplier according to an embodiment of the present invention.

FIG. 6 shows a multiplier according to an embodiment of the present invention, the multiplier being in the form of an integrated semiconductor circuit. The multiplier includes a first register 1 for temporarily storing an M-bit multiplier, a second register 2 for temporarily storing an N-bit multiplicand, an arithmetic unit 10 supplied with output signals from the first and second registers 1, 2 for generating a plurality of partial products and adding the partial products, and a third register 3 for temporarily storing an output signal from the arithmetic unit 10 as a product. For repeating a multiplication, a fourth register, i.e., a RAM (random-access memory) 7, supplies the product stored in the third register 3 to the second register 2, and the arithmetic unit 10 repeats the above multiplication.

Figure 7:
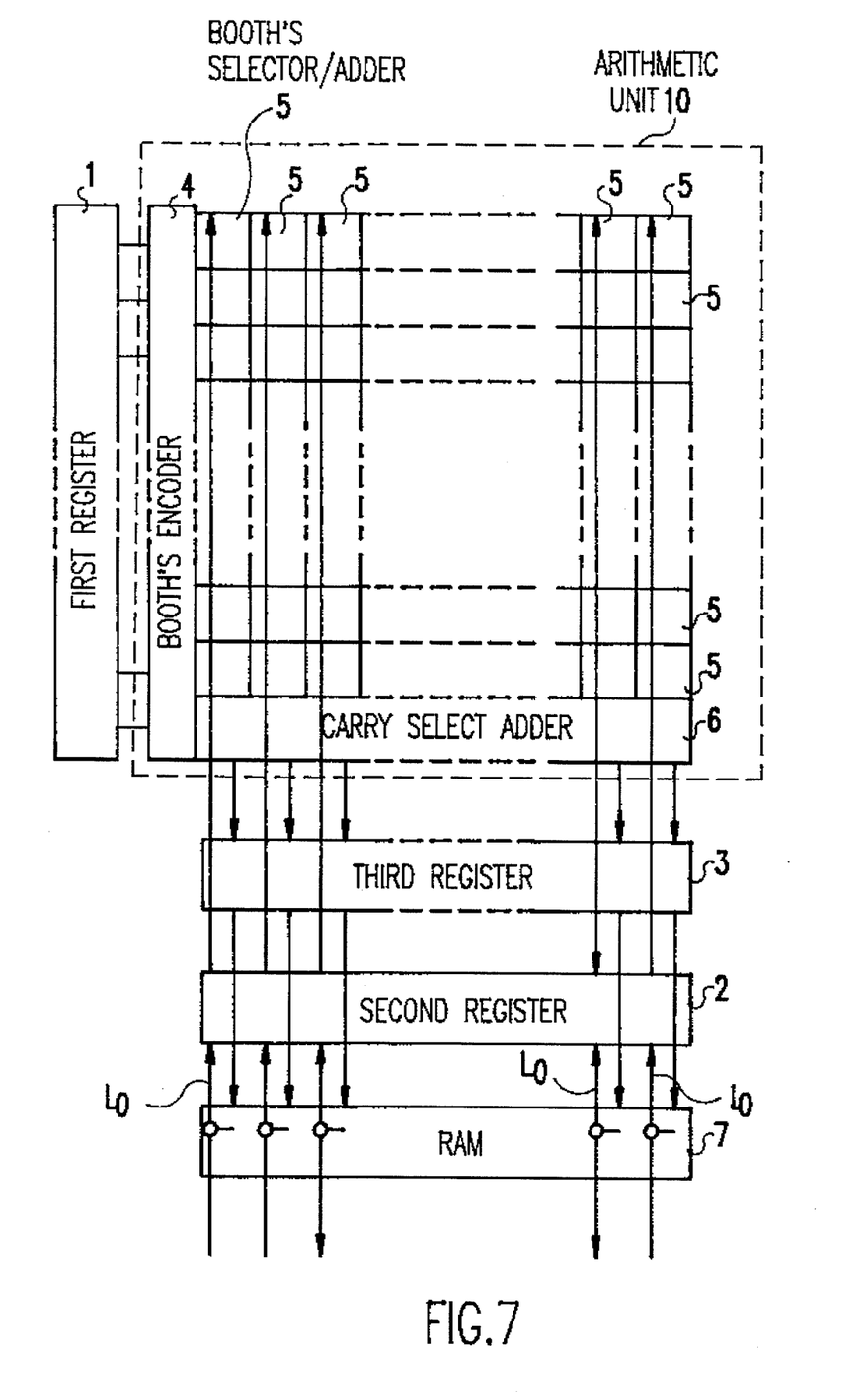
FIG. 7 is a diagram showing a layout and a wiring arrangement of the multiplier shown in FIG. 6.

The multiplier shown in FIG. 6 has a layout and a wiring arrangement as shown in FIG. 7. In FIG. 7, the arithmetic unit 10 comprises a rectangular matrix of Booth's selector/adders 5 arranged in the shape of a rectangle, a Booth's encoder 4 disposed alongside one of the outermost columns of the Booth's selector/adders 5, and a carry select adder 6 disposed alongside one of the outermost rows of the Booth's selector/adders 5. The first register 1 is positioned alongside the Booth's encoder 4, and the third register 3, the second register 2, and the RAM 7 are positioned near the carry select adder 6 in that order.

To carry out repeated multiplications, the multiplier is supplied from the first register 1, and the multiplicand is supplied from the second register 2, and the multiplicand is multiplied by the multiplier according to the Booth's algorithm. According to the present embodiment, the wires do not extend outside of the multiplier as has been the case of the external bus of the prior art and are made shorter in view of the fact that the bits of the output signal from the second register 2 are connected in common to one of the input terminals of the Booth's selector/adders 5 of the arithmetic unit 10 for generating a plurality of partial products and adding the partial products which correspond respectively to the bits (those of the matrix of selector/adders 5 which belong to the columns corresponding to the bits of the output signal from the second register 2).

More specifically, in the conventional multiplier, the second and third registers are spaced from each other, one on each side of the arithmetic unit. According to the present embodiment, the second register 2 is disposed next to the third register 3, and the RAM 7 is positioned next to the second register 2. Therefore, output wires from the second register 2 extend through the third register 3 and are connected to the selector/adders 5 corresponding to the bits of the second register 2, and output wires from the third register 3 extend through the second register 2 and are connected to the RAM 7. External signals are supplied through wires $L_0$ which are used in common as both the input wires of the second register 2 and output wires of the RAM 7. The wires $L_0$ which can be connected to an external circuit are short, without passing through a bus, as the second register 2 and the RAM 7 are positioned next to each other.

An example of repeated multiplications carried out by the multiplier shown in FIG. 6 will be described below. A solution of the aforesaid problems will be confirmed based on the flow of signals in the multiplier. In a first multiplication cycle, an M-bit multiplier is given to the first register 1, and an N-bit multiplicand is given from outside of the RAM 7 to the wires $L_0$ (FIG. 7), and supplied through the RAM 7 to the second register 2. The multiplicand is then outputted from the second register 2, passes through the third register 3, and is supplied from the third register 3 to the arithmetic unit 10 where it is given in common at each column to one of the input terminals of the Booth's selector/adders 5 for generating a plurality of partial products and adding the partial products which correspond respectively to the input bits. The result or product of the first multiplication cycle in the arithmetic unit 10 is given to the third register 3, which transfers the received product to the RAM 7 through the wires which extend through the second register 2.

In a second multiplication cycle, an output signal from the RAM 7 is given as an N-bit multiplicand through the wires $L_0$ to the second register 2. An output signal from the second register 2 passes through the wires which extend through the third register 3, from which it is given in common to one of the input terminals of the Booth's selector/adders 5 for generating a plurality of partial products and adding the partial products which correspond respectively to the input bits. The result or product of the second multiplication cycle in the arithmetic unit 10 is given to the third register 3, which transfers the received product to the RAM 7 through the wires which extend through the second register 2.

Third, fourth, and fifth multiplication cycles are carried out in the same manner as the second multiplication cycle. It can be confirmed that wires extending from the output terminals of the third register 3 which temporarily stores the product to the input terminals of the RAM 7, and wires extending from the output terminals of the RAM 7 to the input terminals of the second register 2 do not pass through an external bus.

Figure 8:
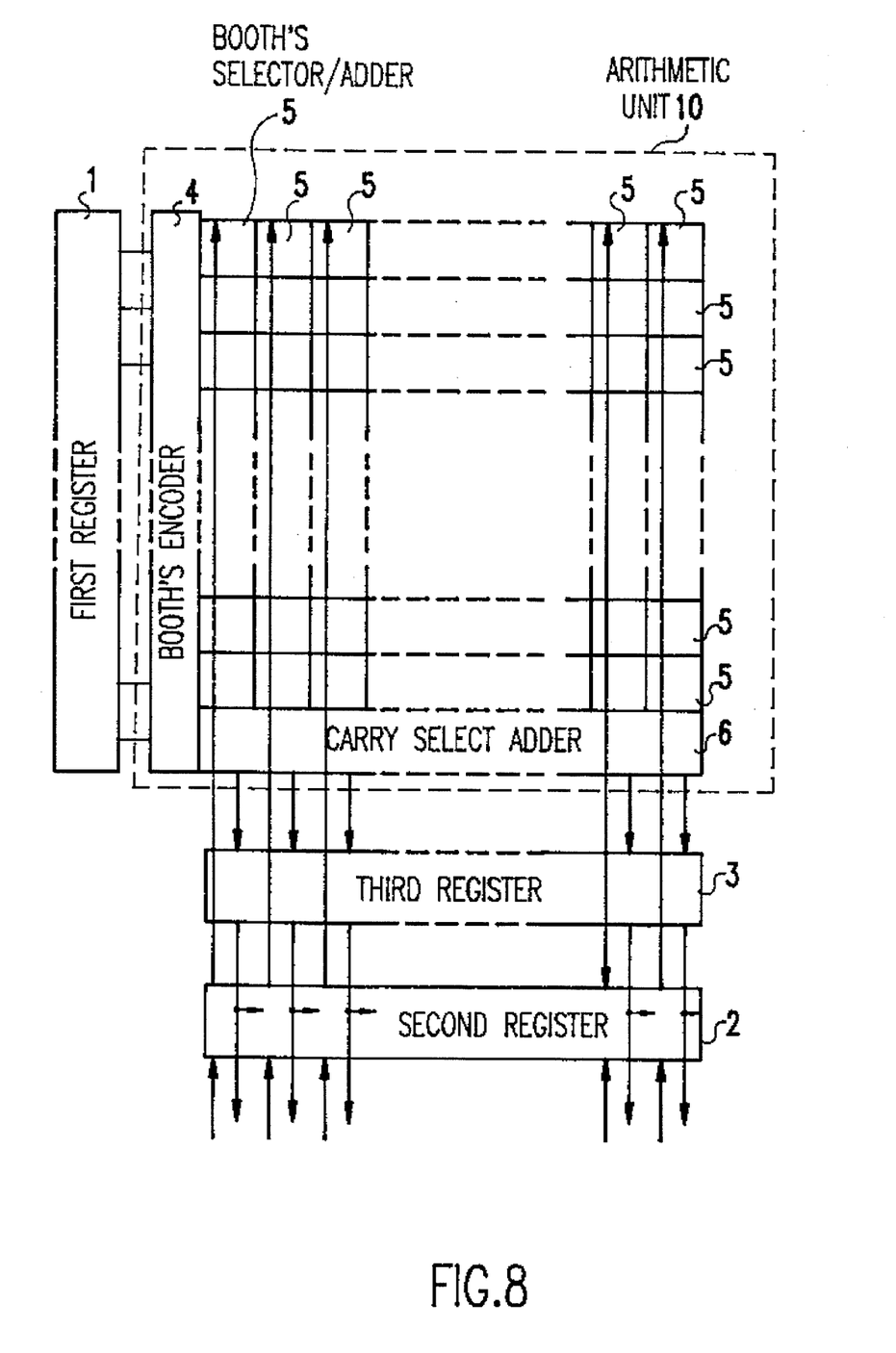
FIG. 8 is a diagram showing a layout and a wiring arrangement of a multiplier according to another embodiment of the present invention.

FIG. 8 shows a layout and a wiring arrangement of a multiplier according to another embodiment of the present invention. The multiplier shown in FIG. 8 differs from the multiplier shown in FIGS. 1 and 2 in that no RAM is employed in the multiplier shown in FIG. 8. For effecting repeated multiplications with the multiplier shown in FIG. 8, an output signal from the third register is given directly to the second register 2.

For comparison, multipliers in the form of semiconductor devices for carrying out repeated multiplications of a 24-bit multiplier and a 24-bit multiplicand were prepared in the layouts shown in FIGS. 8 and 3, respectively. In the multiplier with the layout shown in FIG. 3, the first, second, and third registers 71, 72, 73, the arithmetic unit 80, and an external bus 81 occupy an area of 1.9431 mm² as shown in FIG. 5. In the multiplier with the layout shown in FIG. 8, however, the first, second, and third registers 1, 2, 3, the arithmetic unit 10, and the wires extending therebetween occupy an area of 1.7835 mm². Therefore, the area occupied by the multiplier produced according to the present invention as shown in FIG. 8 was about 90% of the area occupied by the conventional multiplier produced as shown in FIG. 3.

As described above, since the third register for holding the product is disposed outside of the arithmetic unit, and the second register is disposed outwardly of and adjacent to the third register, repeated multiplications can be carried out without the need for an external bus. The multiplier is thus free of any excessive area which would otherwise be occupied by such an external bus. Furthermore, the output signal from the fourth register or the RAM can be transmitted to the second register at an increased speed, and the output signal from the third register can be transmitted to the RAM at an increased speed.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. A multiplier comprising an integrated semiconductor circuit comprising:

a first register for storing an M-bit multiplier;

a second register for storing an N-bit multiplicand;

an arithmetic unit comprising of a rectangular matrix of arithmetic elements arranged in rows and columns, a Booth's encoder disposed along a first outer edge of said rectangular matrix parallel to said columns, and a carry select adder disposed along a second outer edge of said rectangular matrix parallel to said rows, said arithmetic elements in each of said columns having input terminals connected by a common wire in each of said columns, the arrangement being such that bits of the multiplicand stored in said second register are inputted through the common wires to the arithmetic elements, the M-bit multiplier is encoded by said Booth's encoder and outputted, and an encoded output is supplied to the arithmetic elements and added according to a carry/save process, whereby the N-bit multiplicand stored in said second register is multiplied by the M-bit multiplier stored in said first register according to a Booth's algorithm; and a third register for storing a product produced by said arithmetic unit;

said first register extending along said Booth's encoder;

said third register extending along said carry select adder;

said second register extending along said third register in confronting relation to said carry select adder with said third register interposed therebetween;

said second register and said arithmetic unit being connected by common wires which pass through said third register.

2. A multiplier according to claim 1, wherein said third register has output wires extending out of the multiplier through said second register.

3. A multiplier according to claim 2, wherein said first, second, and third registers, said arithmetic unit, said common wires, and wires connected to said first, second, and third registers, and said arithmetic unit are disposed on one substrate surface.

4. A multiplier according to claim 1, wherein said first, second, and third registers, said arithmetic unit, said common wires, and wires connected to said first, second, and third registers, and said arithmetic unit are disposed on one substrate surface.

5. A multiplier comprising an integrated semiconductor circuit comprising:

a first register for storing an M-bit multiplier;

a second register for storing an N-bit multiplicand;

an arithmetic unit comprising of a rectangular matrix of arithmetic elements arranged in rows and columns, a Booth's encoder disposed along a first outer edge of said rectangular matrix parallel to said columns, and a carry select adder disposed along a second outer edge of said rectangular matrix parallel to said rows, said arithmetic elements in each of said columns having input terminals connected by a common wire in each of said columns, the arrangement being such that bits of the multiplicand stored in said second register are inputted through the common wires to the arithmetic elements, the M-bit multiplier is encoded by said Booth's encoder and outputted, and an encoded output is supplied to the arithmetic elements and added according to a carry/save process, whereby the N-bit multiplicand stored in said second register is multiplied by the M-bit multiplier stored in said first register according to a Booth's algorithm;

a third register for storing a product produced by said arithmetic unit; and a fourth register for receiving the product stored in said third register and storing the received product in said second register in order to repeat a multiplication;

said first register extending along said Booth's encoder;

said third register extending along said carry select adder;

said second register extending along said third register in confronting relation to said carry select adder with said third register interposed therebetween;

said fourth register extending along said third register in confronting relation to said third register with said second register interposed therebetween;

said second register and said arithmetic unit being connected by common wires which pass through said third register;

said third register having output wires extending through said second register and connected to input terminals of said fourth register;

said second register having input wires extending through said fourth register and connected to input terminals of said second register and output terminals of said fourth register.

6. A multiplier according to claim 5, wherein said first, second, third, and fourth registers, said arithmetic unit, said common wires, and wires connected to said first, second, third, and fourth registers, and said arithmetic unit are disposed on one substrate surface.

7. A multiplier according to claim 5, wherein said fourth register comprises a random-access memory.

8. A multiplier according to claim 7, wherein said first, second, third, and fourth registers, said arithmetic unit, said common wires, and wires connected to said first, second, third, and fourth registers, and said arithmetic unit are disposed on one substrate surface.

* * * * *